(12) United States Patent
Sargent et al.

(10) Patent No.: US 11,772,720 B2
(45) Date of Patent: Oct. 3, 2023

(54) VEHICLE ACTIVE AERODYNAMIC DEVICE WITH SERVICE SUPPORT LOGIC AND MECHANISM

(71) Applicant: Toyota Motor Engineering & Manufacturing North America, Inc., Plano, TX (US)

(72) Inventors: Corey Benjamin Sargent, Novi, MI (US); Jesse Rydell, Ann Arbor, MI (US); Alexandra Noelle Gaunt, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 21 days.

(21) Appl. No.: 17/508,121

(22) Filed: Oct. 22, 2021

(65) Prior Publication Data

US 2023/0129892 A1 Apr. 27, 2023

(51) Int. Cl.
*B62D 35/00* (2006.01)
*B62D 35/02* (2006.01)

(52) U.S. Cl.
CPC .......... *B62D 35/005* (2013.01); *B62D 35/02* (2013.01)

(58) Field of Classification Search
CPC ..... B62D 35/001; B62D 35/005; B62D 35/02
USPC ........................................... 296/180.3, 180.5
See application file for complete search history.

(56) References Cited

U.S. PATENT DOCUMENTS

| | | | | |
|---|---|---|---|---|
| 10,124,839 B2* | 11/2018 | Povinelli | ............... | B62D 35/02 |
| 10,207,752 B2 | 2/2019 | Causley | | |
| 10,625,792 B2* | 4/2020 | Shiga | ................... | B62D 35/005 |
| 10,679,437 B1 | 6/2020 | Dudar | | |
| 10,768,074 B2 | 9/2020 | Kasaiezadeh et al. | | |
| 10,953,933 B2* | 3/2021 | Schmitt | ............... | B62D 35/005 |
| 11,077,892 B2* | 8/2021 | Grebel | ................... | B62D 37/02 |
| 11,155,312 B2* | 10/2021 | Shiga | ..................... | B62D 37/02 |
| 11,161,556 B2* | 11/2021 | Zhang | ................. | B62D 35/005 |
| 11,161,557 B2* | 11/2021 | Urbach | ............... | B62D 35/005 |
| 2016/0159412 A1* | 6/2016 | Oxley | ................... | B62D 35/007 296/180.5 |
| 2018/0264996 A1* | 9/2018 | Gudimalla | ............... | G05G 1/02 |
| 2020/0094889 A1* | 3/2020 | Shiga | ................... | B62D 35/005 |
| 2020/0324834 A1* | 10/2020 | Kelly | ..................... | B62D 37/02 |

FOREIGN PATENT DOCUMENTS

| | | |
|---|---|---|
| CN | 210734324 U | 6/2020 |
| WO | 2019063730 A1 | 4/2019 |

* cited by examiner

*Primary Examiner* — Jason S Daniels
(74) *Attorney, Agent, or Firm* — Dinsmore & Shohl LLP

(57) ABSTRACT

A vehicle includes an aerodynamic device. The aerodynamic device includes: an air dam movable between a deployed position and a retracted position, an actuator operatively coupled to the air dam, the actuator configured to move the air dam between the deployed position and the retracted position, and a controller communicatively coupled to the actuator. The controller is configured to operate the actuator to move the air dam into the deployed position when the controller receives a service request signal.

8 Claims, 4 Drawing Sheets

VEHICLE ACTIVE AERODYNAMIC DEVICE WITH SERVICE SUPPORT LOGIC AND MECHANISM

TECHNICAL FIELD

The present specification generally relates to aerodynamic devices for vehicles and, more specifically, active aerodynamic devices for vehicles positionable between a deployed position and a retracted position.

BACKGROUND

Vehicles may include front end aerodynamic devices, often referred to as air dams, front spoilers, and the like. However, it may prove problematic to service vehicles with certain types of aerodynamic devices.

Accordingly, a need exists for aerodynamic devices that include service support logic or a mechanism to allow the aerodynamic devices to be repositioned, thereby permitting the vehicle components to be serviced.

SUMMARY

According to a first embodiment of the present disclosure, a vehicle includes an aerodynamic device. The aerodynamic device includes: an air dam movable between a deployed position and a retracted position, an actuator operatively coupled to the air dam, the actuator configured to move the air dam between the deployed position and the retracted position, and a controller communicatively coupled to the actuator. The controller is configured to operate the actuator to move the air dam into the deployed position when the controller receives a service request signal.

According to a second embodiment, a vehicle includes: a vehicle front end structure, an air dam coupled to the vehicle front end structure and movable between a deployed position and a retracted position, one or more outer linkage members coupling the air dam to the vehicle front end structure, an actuator including a link, the actuator configured to move the air dam between the deployed position and the retracted position, and one or more coupling members removably coupling the air dam to the link of the actuator. When the one or more coupling members are removed, the air dam is uncoupled from the actuator and freely moves from the retracted position to the deployed position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Active aerodynamic devices for a front end of a vehicle that are positionable between a deployed position and a retracted position, often referred to as air dams, front spoilers, and the like, may be positionable between the deployed position and the retracted position based on one or more driving conditions of the vehicle such as, for example, speed of the vehicle. However, when in the retracted position, the aerodynamic device may cover other vehicle components at the underside of the vehicle, such as an undercover of the vehicle which provides access to an engine oil pan once removed. As such, the aerodynamic devices render it difficult to access and provide service to these components when the aerodynamic device is in the retracted position. Alternatively, these aerodynamic devices may include cutout portions or recesses formed in the aerodynamic devices to allow access to the components. However, this requires significant structural modifications to the aerodynamic devices and oftentimes results in reduced performance.

Embodiments described herein are directed to a vehicle that includes an active aerodynamic device positionable between a deployed position and a retracted position either automatically in response to service logic or manually in response to detaching a portion of the aerodynamic device from the vehicle. In the deployed position, the aerodynamic device is rotated to extend in a vehicle downward direction from a front bumper of the vehicle to redirect air flow away from an underside of the vehicle. In the retracted position, the aerodynamic device is rotated in a vehicle upward direction and a vehicle rearward direction toward the underside of the vehicle to allow air to flow along the underside of the vehicle. However, as discussed in more detail herein, while in the retracted position, the aerodynamic device may cover certain vehicle components at the underside of the vehicle, such as an undercover of the vehicle which provides access to an engine oil pan of the vehicle once removed. As such, the vehicle includes a control system configured to move the aerodynamic device between the deployed position and the retracted position to allow access to the vehicle components at the underside of the vehicle.

The aerodynamic device may include an air dam, a pair of outer linkage members pivotally coupling the air dam to the vehicle, an actuator configured to pivot the air dam between the deployed position and the retracted position, and one or more coupling members removably coupling the air dam to the actuator. In embodiments, the one or more coupling members may be removed to allow the air dam to be manually pivot into the deployed position to allow access to the other vehicle components. Various embodiments of the aerodynamic device will be described in more detail herein.

Figure 1:
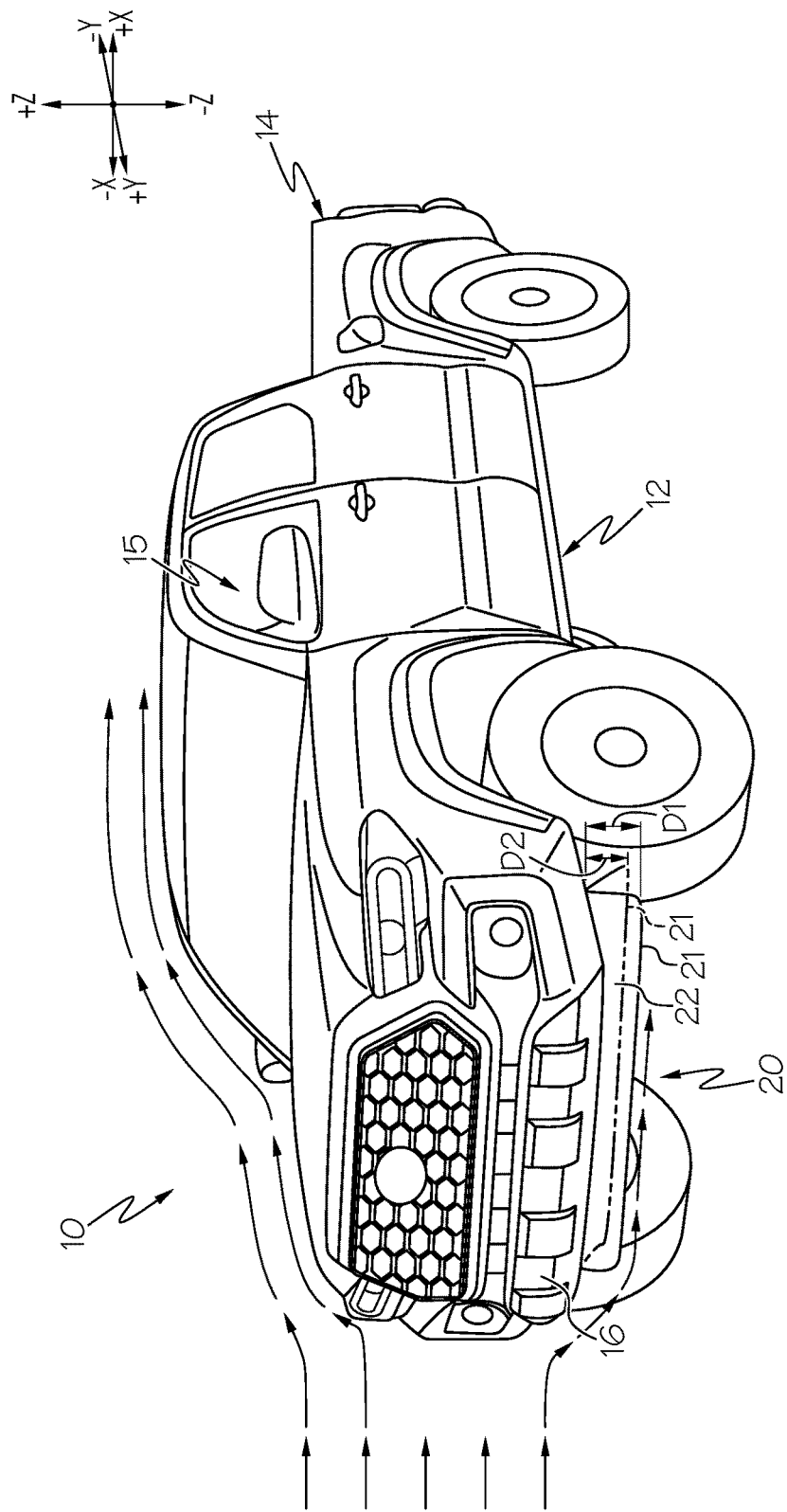
FIG. 1 schematically depicts a perspective view of a vehicle including an aerodynamic device, according to one or more embodiments shown and described herein.

Referring now to FIG. 1, a vehicle 10 including a passenger compartment 15, a front bumper 16 and an aerodynamic device 20 coupled to the front bumper 16 opposite a rear end 14 of the vehicle 10 is depicted. The aerodynamic device 20 may be movable between a deployed position (shown in solid lines) and a retracted position (shown in dashed lines). The aerodynamic device 20 has a width direction extending perpendicular to a length direction of the aerodynamic device 20, which extends in a vehicle lateral direction (e.g., in the +/−X direction of the coordinate axes depicted in the drawings). In the deployed position, the width direction of the aerodynamic device 20 may extend substantially perpendicular (+/−10 degrees) to a vehicle longitudinal direction or vehicle front-rear direction (e.g., in the +/−Y direction of the coordinate axes depicted in the figures) to redirect air flow away from an underside 12 of the vehicle 10, thereby providing aerodynamic benefits, such as reduced drag, while driving. The aerodynamic device 20 may include an air dam 22 with a lower edge 21, as will be described in further detail herein. In the deployed position, the lower edge 21 of the air dam 22 may be a distance D1 from the front bumper 16 of the vehicle 10 in a vehicle vertical direction (e.g., in the +/−Z direction of the coordinate axes depicted in the figures). In the retracted position, the aerodynamic device 20 may be rotated in a vehicle upward direction and a vehicle rearward direction toward the underside 12 of the vehicle 10 to allow an increased amount of air flow on the underside 12 of the vehicle 10. In the retracted position, the aerodynamic device 20 may extend substantially parallel (+/−10 degrees) to the vehicle front-rear direction (e.g., in the +/−Y direction). In the retracted position, the lower edge 21 of the air dam 22 may be a distance D2 from the front bumper 16 of the vehicle 10 in the vehicle vertical direction. The distance D2 may be less than the distance D1. In embodiments, the aerodynamic device 20 may extend linearly in the vehicle vertical direction, such that the aerodynamic device 20 extends and retracts into the front bumper 16 in the vehicle vertical direction. When the aerodynamic device 20 is in the retracted position, the aerodynamic device 20 may inhibit access to vehicle components on the underside of the vehicle 10, such as an undercover. The undercover may need to be accessed to service components in that area of the vehicle 10, such as various engine components.

Figure 2:
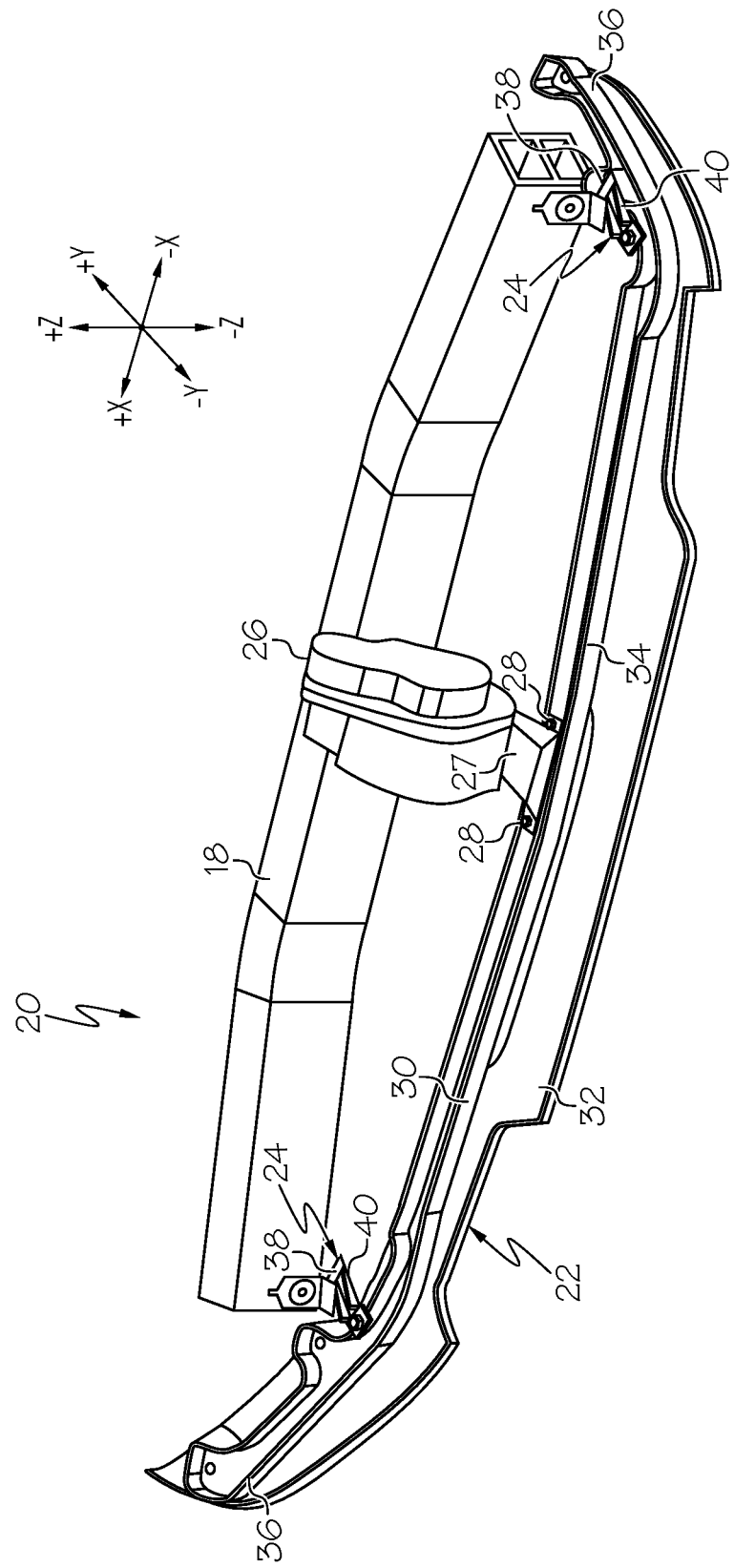
FIG. 2 schematically depicts a perspective view of the aerodynamic device of FIG. 1 in a retracted position, according to one or more embodiments shown and described herein.
Figure 3:
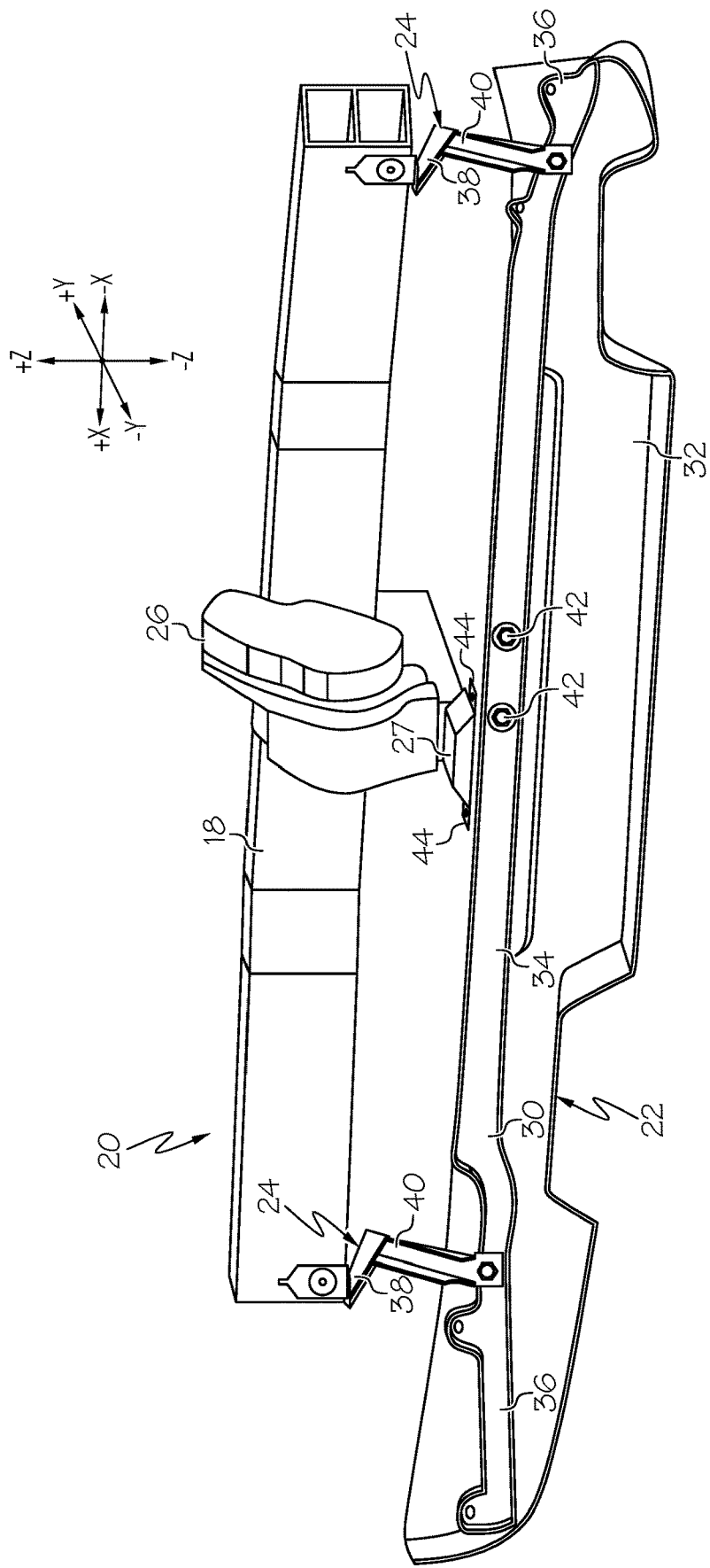
FIG. 3 schematically depicts a perspective view of the aerodynamic device of FIG. 1 in a deployed position, according to one or more embodiments shown and described herein.

Referring now to FIGS. 2 and 3, the aerodynamic device 20 may include the air dam 22, one or more outer linkage members 24, an actuator 26, and one or more coupling members 28. The aerodynamic device 20 is shown in the retracted position in FIG. 2 and in the deployed position in FIG. 3. The air dam 22 may include an elongated structural member 30 and a fin 32 coupled to the elongated structural member 30. The elongated structural member 30 may include a central portion 34, two end portions 36 formed at opposing sides of the central portion 34, and one or more air dam attachment features 42 (FIG. 3). The central portion 34 may be curved to complement a curvature of the front bumper 16 of the vehicle 10. In embodiments, the two end portions 36 may be obliquely angled from the central portion 34. The end portions 36 may be angled in a vehicle rearward direction (e.g., in the —Y direction of the depicted coordinate axes) toward the rear end 14 of the vehicle 10. In embodiments, the two end portions 36 may not be angled. The air dam attachment features 42 may be disposed on the central portion 34 of the elongated structural member 30. In embodiments, the air dam attachment features 42 may be disposed on the end portions 36 of the elongated structural member 30. The air dam attachment features 42 may be defined by one or more receiving holes configured to receive a fastener, such as a bolt, a rivet, a pin and shaft, a set screw, or the like. The elongated structural member 30 and the fin 32 may be formed of any material, such as aluminum, steel, thermoplastic, rubber, carbon fiber, or the like. The elongated structural member 30 and the fin 32 may be formed separately and joined together, or may be integrally formed as a monolithic, one-piece structure. The elongated structural member 30 and the fin 32 may be formed from separate materials, or from the same material.

The outer linkage members 24 may pivotally couple the air dam 22 to the vehicle 10. The outer linkage members 24 may be coupled to the elongated structural member 30. The outer linkage members 24 may be a freely movable linkage, and may include a first link 38 and a second link 40. The first link 38 may be coupled at a first end thereof to a vehicle front end structure 18 of the vehicle 10, and pivotally coupled at an opposite second end thereof to the second link 40. The vehicle front end structure 18 may be a component of the bumper 16 (FIG. 1), such as a bumper reinforcement. The second link 40 may be pivotally coupled at a first end thereof to the first link 38, and coupled at an opposite second end thereof to the elongated structural member 30. The first link 38 may be coupled to the vehicle front end structure 18 via fasteners, welding, adhesive, or the like. The second link 40 may be coupled to the elongated structural member 30 of the air dam 22 via fasteners, welding, adhesive, or the like. The first link 38 and the second link 40 may be pivotally coupled via a pin or other component to allow the first link 38 and the second link 40 to pivot relative to one another. The outer linkage members 24 may be formed of a metal, such as aluminum, steel, or the like.

The actuator 26 may be mounted or coupled to the vehicle front end structure 18 and operatively coupled to the air dam 22, such that the actuator 26 may be configured to pivot the air dam 22 between the deployed position and the retracted position relative to the vehicle front end structure 18. The actuator 26 may include a link 27 that includes one or more actuator attachment features 44. The actuator 26 may pivot the link 27 about an axis defined by the vehicle width direction (e.g., the +/−X direction). The number of actuator attachment features 44 of the link 27 may be the same as the number of air dam attachment features 42 of the elongated structural member 30. The actuator attachment features 44 may be complementary to the air dam attachment features 42 of the elongated structural member 30 such that the actuator 26 may be removably coupled to the air dam 22. In embodiments, each of the air dam attachment features 42 of the elongated structural member 30 and the actuator attachment features 44 of the actuator 26 may be one or more receiving holes configured to receive the coupling members 28. As such, the aerodynamic device 20 may include one or more coupling members 28 configured to removably couple the actuator 26 to the air dam 22. The coupling members 28 may be fasteners, such as a bolt, a rivet, a pin and shaft, a set screw, or the like, configured to couple to each of the air dam attachment features 42 of the elongated structural member 30 and the actuator attachment features 44 of the actuator 26. In embodiments, the coupling members 28 may be fixedly coupled to one of the air dam attachment features 42 and the actuator attachment features 44. The actuator 26 may be a linear actuator, a rotary actuator, a hydraulic or pneumatic actuator, or the like.

The aerodynamic device 20 may transition between an attached state and a detached state. In the attached state, the coupling members 28 are positioned within the air dam attachment features 42 and the actuator attachment features 44. When the coupling members 28 are positioned within the air dam attachment features 42 and the actuator attachment features 44, operation of the actuator 26 controls the positioning of the air dam 22 between the deployed position and the retracted position. In the detached state, the coupling members 28 are removed from the air dam attachment features 42 of the elongated structural member 30 and the actuator attachment features 44. When the coupling members 28 are removed from the air dam attachment features 42 and the actuator attachment features 44, the air dam 22 is uncoupled from the actuator 26, thereby allowing the air dam 22 to pivot downward from the retracted position and into the deployed position. When the air dam 22 moves from the retracted position to the deployed position, the undercover of the vehicle 10 may be accessed to allow servicing of engine components, or other components, that would otherwise be inaccessible with the air dam 22 in the retracted position.

Figure 4:
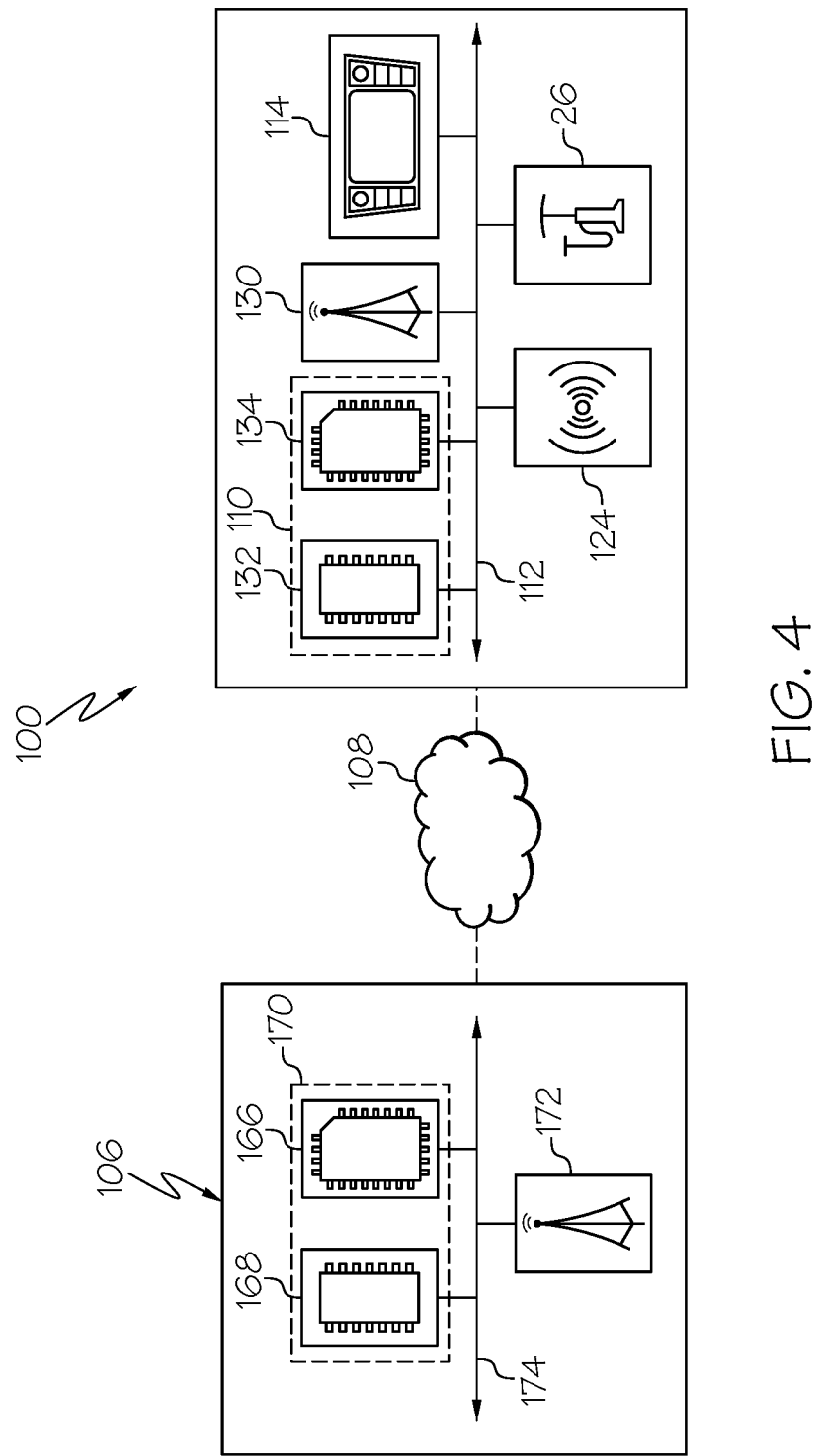
FIG. 4 schematically depicts a control system for operating the aerodynamic device of FIG. 1, according to one or more embodiments shown and described herein.

Referring now to FIG. 4, a control system 100 for controlling the position of the aerodynamic device 20 is depicted. The control system 100 may be incorporated into the vehicle 10, as described in more detail herein. The control system 100 may include a controller 110, a communication path 112, an input device 114, one or more sensors 124, and network interface hardware 130. The various components of the control system 100 and the interaction thereof will be described in detail below. However, it should be noted that, in embodiments, the control system 100 may not include each of the various components discussed herein.

The communication path 112 may be formed from any medium that is capable of transmitting a signal such as, for example, conductive wires, conductive traces, optical waveguides, or the like. Moreover, the communication path 112 may be formed from a combination of mediums capable of transmitting signals. In one embodiment, the communication path 112 includes a combination of conductive traces, conductive wires, connectors, and buses that cooperate to permit the transmission of electrical data signals to components such as processors, memories, sensors, input devices, output devices, and communication devices. Accordingly, the communication path 112 may include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 112 communicatively couples the various components of the control system 100 and the aerodynamic device 20. As used herein, the term "communicatively coupled" means that coupled components are capable of exchanging data signals with one another such as, for example, electrical signals via conductive medium, electromagnetic signals via air, optical signals via optical waveguides, and the like.

The controller 110 may include one or more processors 132 and one or more memory modules 134. Each of the one or more processors 132 may be any device capable of executing machine readable instructions. Accordingly, each of the one or more processors 132 may be an integrated circuit, a microchip, a computer, or any other computing device. The one or more processors 132 are communicatively coupled to the other components of the control system 100, the aerodynamic device 20, and/or the vehicle 10 by the communication path 112. Accordingly, the communication path 112 may communicatively couple any number of processors with one another, and allow the modules coupled to the communication path 112 to operate in a distributed computing environment. Specifically, each of the modules may operate as a node that may send and/or receive data.

Each of the one or more memory modules 134 of the controller 110 is coupled to the communication path 112 and communicatively coupled to the one or more processors 132. The one or more memory modules 134 may include RAM, ROM, flash memories, hard drives, or any device capable of storing machine readable instructions such that the machine readable instructions may be accessed and executed by the one or more processors 132. The machine readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 134. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more memory modules 134 may include machine readable instructions that, when executed by the one or more processors 132, cause the control system 100 to perform the actions described below.

Still referring to FIG. 4, the control system 100 includes the input device 114 coupled to the communication path 112 such that the communication path 112 communicatively couples the input device 114 to other modules of the control system 100. The input device 114 may be any device capable of transforming mechanical, optical, or electrical signals into a data signal capable of being transmitted with the communication path 112. Specifically, the input device 114 may include any number of movable objects that each transform physical motion into a data signal that may be transmitted to over the communication path 112 such as, for example, a button, a switch, a knob, a microphone, or the like. The input device 114 may be provided within the passenger compartment 15 (FIG. 1) of the vehicle 10. In embodiments, the input device 114 may be a stalk mounted on a steering column of the vehicle 10, such as a windshield wiper stalk, a turn signal stalk, a cruise control stalk, or the like. In other embodiments, the input device 114 may be a multimedia interface, or other interface, within the vehicle 10. Operation of the input device 114 may send a service request signal to the controller 110, indicating a desire to move the aerodynamic device 20 to the deployed position. In embodiments, the service request signal may be sent by the input device 114 in response to the input device 114 being operated for a predetermined amount of time. For example, the service request signal may be sent upon operating the windshield wipers stalk for a predetermined amount of time. The predetermined amount of time may be greater than one second, such as two seconds, three seconds, four seconds, or greater than four seconds.

As noted above, the control system 100 includes the one or more sensors 124. The sensors 124 may be configured to detect an engine or motor state of the vehicle, such as an OFF and an ON state, and a gear in which the vehicle 10 is positioned, such as a Drive gear, a Reverse gear, a Neutral gear, and a Park gear. It should be appreciated that power may still be supplied to components of the vehicle 10, specifically the aerodynamic device 20, for a predetermined amount of time after the vehicle 10 transitions from the ON state to the OFF state. In embodiments, the predetermined amount of time may be greater than 20 seconds, greater than 45 seconds, or greater than 1 minute.

As noted above, the control system 100 includes the network interface hardware 130 for communicatively coupling the control system 100 with an external device 106 via a network 108. The network interface hardware 130 is coupled to the communication path 112 such that the communication path 112 communicatively couples the network interface hardware 130 to other modules of the control system 100. The network interface hardware 130 may be any device capable of transmitting and/or receiving data via a wireless network. Accordingly, the network interface hardware 130 may include a communication transceiver for sending and/or receiving data according to any wireless communication standard. For example, the network interface hardware 130 may include a chipset (e.g., antenna, processors, machine readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 130 includes a Bluetooth® transceiver that enables the control system 100 to exchange information with a mobile device such as, for example, a smartphone, via Bluetooth® communication.

Still referring to FIG. 4, the external device 106 includes a controller 166 including one or more processors 168 and one or more memory modules 170, network interface hardware 172, and a communication path 174. The one or more processors 168 may be an integrated circuit, a microchip, a computer, or any other computing device. The one or more memory modules 170 may include RAM, ROM, flash memories, hard drives, or any device capable of storing machine readable and executable instructions such that the machine readable and executable instructions can be accessed by the one or more processors 168. The communication path 174 may be similar to the communication path 112 in some embodiments. The external device 106 may be any computer device capable of transmitting signals, such as a phone, a tablet, or the like. The external device 106 may operate similarly to the input device 114 as described above. Specifically, the external device 106 may be configured to send a service request signal via the network 108 to the controller 110 to control operation of the actuator 26.

The operation of the aerodynamic device 20 will now be described with reference to FIGS. 1 and 4. The aerodynamic device 20 may initially be in the retracted position. In the retracted position, the aerodynamic device 20 may extend over an undercover on the underside 12 of the vehicle 10, thereby restricting access to vehicle components to be serviced. When the controller 110 receives the service request signal from the input device 114, the controller 110 may determine whether the vehicle 10 is in the OFF state or the ON state based on data received from the one or more sensors 124. In response to the controller 110 determining that the vehicle 10 is in the OFF state and the predetermined amount of time has not elapsed such that power is still provided to the aerodynamic device 20, the controller 110 may operate the actuator 26 to move the air dam 22 from the retracted position to the deployed position. Thereafter, in response to the controller 110 determining that the vehicle 10 transitions from the OFF state to the ON state and the vehicle 10 is operated in a gear other than the Park gear, for example, the Drive gear or the Reverse gear, the controller 110 may operate the actuator 26 to move the air dam 22 from the deployed position to the retracted position.

It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle including an aerodynamic device, the aerodynamic device comprising:
   an air dam movable between a deployed position and a retracted position;
   an actuator operatively coupled to the air dam, the actuator configured to move the air dam between the deployed position and the retracted position;
   a sensor configured to detect when the vehicle is in an ON state or an OFF state; and
   a controller communicatively coupled to the actuator and the sensor, the controller configured to operate the actuator to move the air dam into the deployed position when the controller receives a service request signal and determines that the vehicle is in the OFF state.

2. The vehicle of claim 1, wherein the air dam is configured to be pivotally coupled to a front bumper of the vehicle.

3. The vehicle of claim 2, wherein:
   the vehicle further comprises a bumper,
   the air dam further comprises a lower edge,
   in the deployed position, the lower edge of the air dam is a distance D1 from the front bumper in a vehicle vertical direction,
   in the retracted position, the lower edge of the air dam is a distance D2 from the front bumper in the vehicle vertical direction, and
   the distance D2 is less than the distance D1.

4. The vehicle of claim 1, wherein the controller is configured to receive the service request signal from an external device.

5. The vehicle of claim 1, further comprising an input device provided within a passenger compartment of the vehicle configured to send the service request signal to the controller.

6. The vehicle of claim 5, wherein the input device sends the service request signal when the input device is actuated for a predetermined amount of time that is greater than 1 second.

7. The vehicle of claim 5, wherein the input device is a multimedia interface on the vehicle.

8. The vehicle of claim 5, wherein the input device is selected from the group consisting of a turn signal stalk, a windshield wiper stalk, and a cruise control stalk.

* * * * *